United States Patent
Kuehner et al.

(10) Patent No.: US 6,794,835 B2
(45) Date of Patent: Sep. 21, 2004

(54) CIRCUIT ARRANGEMENT FOR ELECTRICAL MACHINES

(75) Inventors: Jochen Kuehner, Backnang-Heiningen (DE); Klaus Beulich, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/403,151

(22) Filed: Mar. 31, 2003

(65) Prior Publication Data

US 2003/0205974 A1 Nov. 6, 2003

(30) Foreign Application Priority Data

May 3, 2002 (DE) .......................................... 102 19 819

(51) Int. Cl.[7] .............................................. H02K 23/00
(52) U.S. Cl. ........................ 318/254; 318/138; 318/439
(58) Field of Search ................................ 318/254, 138, 318/439; 322/28

(56) References Cited

U.S. PATENT DOCUMENTS 5,818,115 A   10/1998   Nagao
6,462,517 B2 * 10/2002  Asada ........................... 322/28
6,510,062 B2 *  1/2003  Goder et al. ............... 363/21.11

FOREIGN PATENT DOCUMENTS

| DE | 1 003 479     | 2/1957  |
| DE | 197 33 212 A1 | 2/1999  |
| EP | 1 253 698 A   | 10/2002 |

OTHER PUBLICATIONS

Patent Abstracts of Japan vol. 017, No. 064 (M–1364 Feb. 8, 1993 & JP 04 271209 A, Sep. 28, 1992.

Ian Hegglun's: "Stepping Out", Electronica World and Wireless World, Reed Business Publishing, Sutton, Surrey, GB BD. 102, NR. 1726, Oct. 1, 1996.

* cited by examiner

*Primary Examiner*—Karen Masih
(74) *Attorney, Agent, or Firm*—Michael J. Striker

(57) ABSTRACT

A circuit arrangement for an electrical machine which is connected with at least one phase terminal of the electrical machine, has at least one passive charge pump connectable directly with phase windings of the electrical machine and having another terminal connected through further electronic means with an input/output, at which a switching on/switching off signal for a current supply is produced.

2 Claims, 1 Drawing Sheet

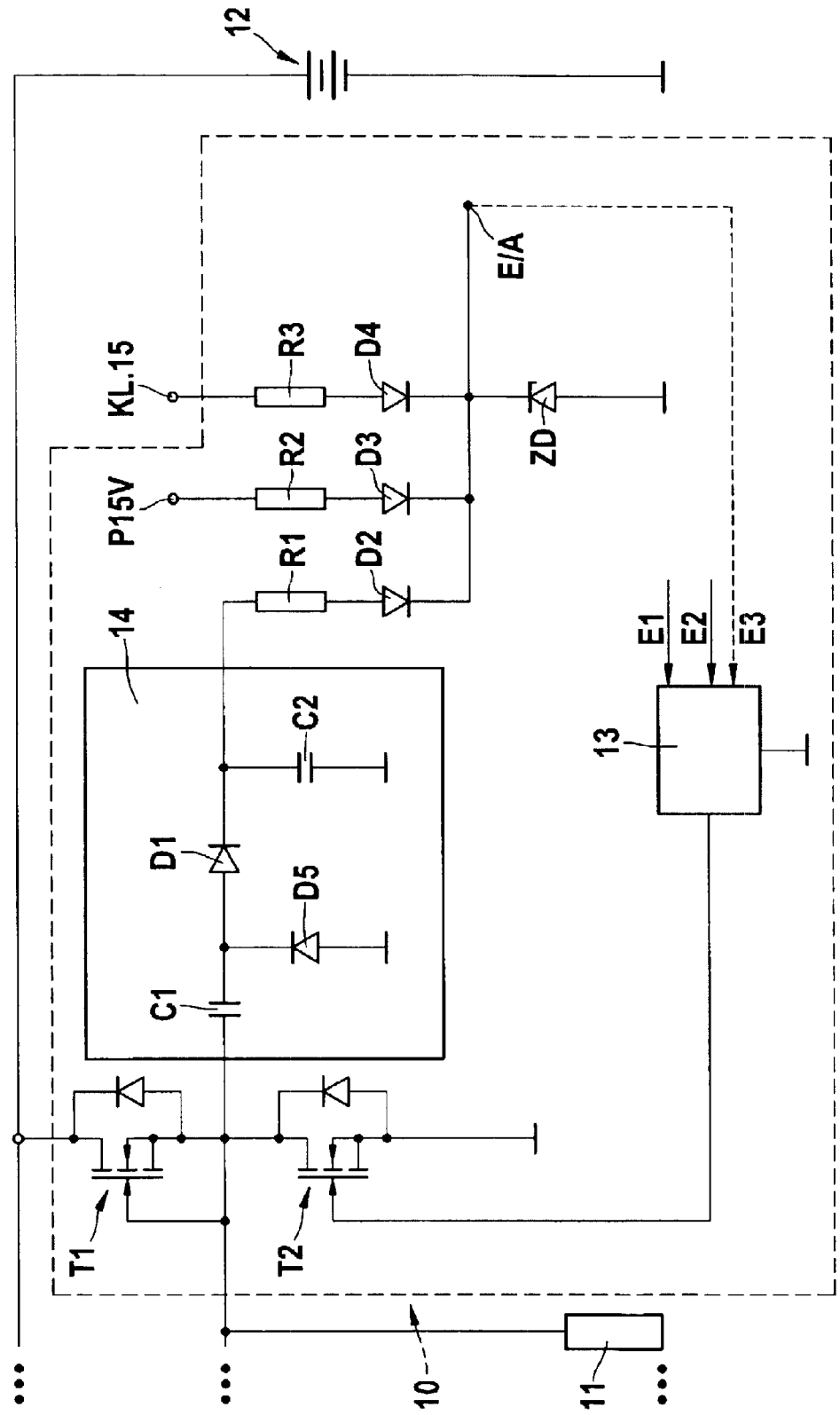

CIRCUIT ARRANGEMENT FOR ELECTRICAL MACHINES

BACKGROUND OF THE INVENTION

The present invention relates to a circuit arrangement for electrical machines and deals in particular with starting circuits for starter-generators to be used in a motor vehicle.

Conventionally in motor vehicles two electrical machines are used namely a generator which is driven from the vehicle and produces electrical energy for supply of a vehicle electrical system consumer and for charging the battery, and furthermore a starter that operates as an electric motor and in the case of starting the motor brings the vehicle to a required minimum rotary speed. Also, such systems are known which have a single electrical machine designed as a starter-generator and operating both for starting the motor and for producing the electrical energy.

Such starter generators are for example flywheel starter-generators or crankshaft starter-generators which are directly in connection with the crankshaft of the motor. The utilized starter generators are three phase current machines which are connected with the vehicle battery through a power electronic system which includes a pulse inverter bridge. The control of the pulse inverter or pulse converter is performed by a current supply itself or by an associated control electronic system. When the electrical machine is for example a permanently excited synchronous machine, then when the machine is rotated a voltage is produced regardless of whether the electronic system is activated or not. With a correspondingly high rotary speed of the synchronous machine it leads to exceeding of the allowable voltage, and there is a danger that the electronic system of the starter generator as well as the vehicle electronic system can be destroyed.

A vehicle electrical system with a starter generator as well as a method for regulating such a starter generator which is connected with the vehicle battery through a pulse inverter bridge is disclosed for example in the German patent document DE 197 33 212 A1. In such a known system, the pulse inverter elements are controlled by a regulating electronic system in a suitable manner, which in the generator operation guarantees an optimal generator regulation and thereby a maximum generation of electrical power. Simultaneously with suitable control of the pulse inverter elements its guaranteed that during the starting of the electrical machine electrical energy can be taken from the battery and thereby operate as an electric motor and the vehicle motor can be accelerated to the starting rotary speed.

Since such known systems deal with the optimal regulation of the generator operating machine in normal operation, no provisions for starting are made and no special starting circuits for the starter generator are provided.

Control devices for starters of internal combustion engines are known in principle and are for example described in the German patent document DE-P 10 034 794.7. This known control devices for a starter include also circuits in which MOSFET-switching transistors can be used, via which for example the holding winding of the starter relay is controlled. One of such MOSSFET transistors is a starting switch. The control of the switching transistors is performed by an electrical start control, which in turn is connected through an interface with the motor control device and obtains from it informations, for example rotary speed informations. The MOSSFET transistor which operates as a starting switch is associated in accordance with one of the examples with a charge pump

SUMMARY OF THE INVENTION

Accordingly, it is an object of the present invention to provide a circuit arrangement for electrical machines which is a further improvement of the existing arrangements.

In keeping with these objects and with others which will become apparent hereinafter, one feature of the present invention resides, briefly stated, in a circuit arrangement for an electrical machine which is connected with at least one phase terminal of the electrical machine, the circuit arrangement comprising at least one passive charge pump which is connectable directly with phase windings of the electrical machine; and has another terminal connected through further electronic means with an input/output, at which a switching on/switching off signal for a current supply is produced.

When the circuit arrangement for electrical machines is designed in accordance with the present invention, it has the advantage that a more reliable start for the current supply of the control electronic system of the electrical machine can be performed.

The associated starting circuit is formed especially simply and can recognize in a simple manner the rotatable machine. Furthermore, the starting circuit, in an especially advantageous manner, is in the position in which it activates the current supply and thereby the complete control electronic system, in particular exactly after the recognized beginning of rotation. This is also possible in deactivated condition of the electronic system.

In a further especially advantageous manner, with the activated control electronic system, via the use of corresponding features, the output voltage of the electrical machine which operates as a generator can be regulated. It is especially advantageous that low circuit expenses are needed, characterized by only four passive components. Furthermore, in a especially advantageous manner no closed-circuit current flows for supplying the charge lamp and a reliable detection of a rotatable machine is possible also with deactivated control electronic system.

Additional advantages are provided when a circuit arrangement includes a passive charge lamp, which is connected with the phase terminal of any semi-bridge of the converter bridge.

In accordance with a further embodiment of the present invention, the passive charge lamp advantageously can be formed only with two capacitors and two diodes.

An advantageous use of the inventive circuit arrangement is possible for starter-generators, in particular crankshaft starter-generators for vehicles.

The novel features which are considered as characteristic for the present invention are set forth in particular in the appended claims. The invention itself, however, both as to its construction and its method of operational, together with additional objects and advantages thereof, will be best understood from the following description of specific embodiments when read in connection with the accompanying drawings.

BRIEF DESCRIPTION OF THE DRAWINGS

A circuit arrangement for a vehicle in accordance with the present invention is shown in an exemplary way in the single FIGURE of the drawings.

DESCRIPTION OF THE PREFERRED EMBODIMENTS

A vehicle electrical system is shown in the single FIGURE of the drawings, and in particular those components which are required for understanding of the invention. It includes an electrical machine 10, for example a starter-generator, preferably a crankshaft-starter-generator which is driven by a not shown internal combustion engine for example of a vehicle, or brings it during start to a minimum rotary speed. A three-phase windings 11 of the electrical machine 10 are shown in the drawings, and can be selected in arbitrary way.

For operation of the electrical machine a pulse converter is provided, that in the case of a three-phase machine includes six pulse inverter elements, which form three semi-bridges. Generally the circuit is operative also for a single semi-bridge of any system. In the drawings for a three-phase machine only the both pulse inverter elements are shown for the phase winding 11 of the associated semi-bridge. The pulse inverter elements are for example transistors, in particular MOSFETs T1 and T2 or other suitable controllable components.

The electrical machine 10 is connectable with the battery 12 through these pulse inverter elements with the transistors T1, T2. The circuitry is such that a terminal of the transistors 71 is connectable with the battery and a terminal of the transistor T2 is connected to ground. In the generator operation the battery is charged via the pulse converter and in motor operation the battery 11 supplies the electrical machine.

The control of the pulse inverter elements is performed with an electronic voltage regulator or a control electronic system 13, which supplies the required control signals to the transistors T1 and T2 as well as to the remaining not shown transistors of the pulse converter, and the transistors are transferred to the conductive or blocking condition being optimized in time. The electronic voltage regulator or a corresponding control device or a control electronic system 13 are supplied with informations required for the calculation of the optimal control of the transistors and also via an input E1, which provides a voltage supply for the control electronic system, for example through the input E2.

The transistors T1, T2 of the pulse converter are connected via a passive charge pump 14 as well via a resistor R1 and a diode D2 with an input/output E/A. A switching on or a switching off signal can be made available for a current supply, which is supplied to the control electronic system 13 through its switching-on input E3. For stabilization purpose a zener diode ZD is provided, which is located between the input/output E/A and the ground. The input/output E/A is connected with the terminal P15 V through a resistor R2 and a diode D3. The terminal KL.15 is connected through a further resistor R3 and a diode D4 with the input/output E/A.

The passive charge pump 14 includes a first capacitor C1 which is connected with the pulse converter, wherein the terminal of the capacitor C1 is connected with the connecting point between the transistors T1 and T2 of the pulse converter directly and also a diode D1 which is connected with the capacitor C1 and with its cathode is connected with the further capacitor C2. A further diode D5 is located between the connection of the capacitor C1 and the diode D1 wherein the circuitry is such that the anode of the diode D5 is connected with the ground.

Since the capacitor C1 is connected with the phase output of the pulse converter bridge, the direct current is uncoupled at the phase output of the generator. When the electrical machine rotates an alternating voltage is induced, which exits on the phase output.

This induced alternating voltage is rectified through the diodes D1 and D5. Thereby the capacitor C2 charges. The following circuit produces then the inventive switching on/switching off signal for the current supply or for the control electronic system 13 and guarantees thereby a reliable start of the control electronic system and thereby a reliable operation of the electrical machine or the starter-generator.

The total circuit arrangement is conventionally a component of a control device 15, for example a board power control device of a vehicle electrical system.

It will be understood that each of the elements described above, or two or more together, may also find a useful application in other types of constructions differing from the types described above.

While the invention has been illustrated and described as embodied in switching arrangement for electrical machines, it is not intended to be limited to the details shown, since various modifications and structural changes may be made without departing in any way from the spirit of the present invention.

Without further analysis, the foregoing will so fully reveal the of the present invention that others can, by applying current knowledge, readily adapt it for various applications without omitting features that, from the standpoint of prior art, fairly constitute essential characteristics of the generic or specific aspects of this invention.

What is claimed is:

1. A circuit arrangement for an electrical machine which is connected with at least one phase terminal of a semi-bridge of the electrical machine, the circuit arrangement comprising at least one charge pump, wherein said charge pump is a passive charge pump, wherein a first terminal of said passive charge pump is connectable directly with phase windings of the electrical machine, wherein a second terminal of the passive charge pump leads to an input/output via further electronic means, wherein at the input/output, a switching on/switching off signal for a current supply is produced, and wherein the passive charge pump includes at least two capacitors and two diodes.

2. A circuit arrangement as defined in claim 1, wherein said capacitors include a first capacitor which is connected with a phase output of the semi-bridge of the electrical machine, an anode of one of said diodes is connected with said first capacitor, and a cathode of said one diode is connected with a second one of said capacitors, while said second capacitor is connected with ground, and a cathode of a further diode is connected with a connection between said first capacitor and said first diode and an anode of said further diode is connected with ground.

* * * * *